United States Patent Office 3,338,702
Patented Aug. 29, 1967

3,338,702
METHOD FOR THE CONTROL OF WEEDS EMPLOYING HALOBENZYL ESTERS OF POLYBASIC ACIDS
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Original application June 11, 1962, Ser. No. 201,261, now Patent No. 3,253,012, dated May 24, 1966. Divided and this application May 23, 1966, Ser. No. 569,773
11 Claims. (Cl. 71—86)

This is a division of our parent application S.N. 201,261, filed June 11, 1962, now U.S. Patent 3,253,012, issued May 24, 1966, which was a continuation-in-part of our application S.N. 714,951, filed Feb. 13, 1958, and now abandoned.

This invention relates to compositions of matter known as ring chlorinated benzyl esters of polybasic acids, and salts thereof.

The present invention resides in 2,3,6-trichlorobenzyl acid-esters of acids selected from the group consisting of lower aliphatic dicarboxylic acids, chlorinated aliphatic dicarboxylic acids, benzene dicarboxylic acids, sulfuric acid, phosphoric acid, and salts thereof. In the case of a dibasic acid, the resultant compound is an half-acid ester in which one carboxylic group is linked to the 2,3,6-trichlorobenzyl group and the other carboxylic group is in the water-soluble salt form. In the case of phosphoric acid, which is a tribasic acid, two acid-ester-type compounds are embraced within the scope of this invention, namely the mono-and di(2,3,6-trichlorobenzyl) ester of phosphoric acid. The lower aliphatic dicarboxylic acids included within the scope of this invention are those having eight or less carbon atoms, such as the lower alkylene dicarboxylic acids. These compounds have unique properties as plant growth regulants and herbicides not logically predictable from the established plant regulating properties of the known herbicides and plant growth regulants of the prior art.

Certain trichlorobenzyl esters of monobasic acids have been proposed as herbicides but have a number of disadvantages, among them being the following: (1) they are insoluble in water and therefore, to formulate them for use in the field, organic solvents and emulsifiers are required; (2) they are incompatible with many water soluble herbicides which would otherwise be useful in conjunction with them, such water-soluble herbicides including sodium chlorate, sodium borate, sodium trichloroacetate, sodium dichloropropionate, amine salts of 2,4-dichlorophenoxyacetic acid, sodium pentachlorophenate, and others; (3) they are relatively volatile and are lost rather rapidly from the soil and furthermore can cause foliar damage on crops adjacent to areas where they are employed; (4) they are ineffective on deeply rooted perennial weeds; (5) they have a rather low level of intrinsic activity; and (6) they are relatively nonselective in crops.

It is an object of the present invention to overcome each of these shortcomings.

We have found that the 2,3,6-trichlorobenzyl acid-esters of said dibasic and polybasic acids possess the desirable properties of water solubility (as their salts), and compatibility with water-soluble herbicides, and have essentially no troublesome volatility. What is most surprising and unexpected is that they have many-times greater level of activity on perennial weeds, and a level of intrinsic herbicidal activity on weeds in general which is several times that of the esters of monobasic acids and diesters of dibasic acids. This large difference in activity between the compounds of the invention and the corresponding esters of monocarboxylic acids and diesters of dibasic acids becomes even more extreme under conditions of dry climate.

A further unexpected and valuable advantage of the compounds of the invention is their ability to give selective control of weeds in monocotyledonous crops, such as corn, sorghum, sugar cane, turf grasses, and the like. Related trichlorobenzyl esters of monocarboxylic acids are deficient in this useful property.

The compounds of our invention are new compositions of matter and are prepared by esterification of 2,3,6-trichlorobenzyl alcohol, or by reaction of 2,3,6-trichlorobenzyl halides with a salt of the appropriate acid, or by transesterification. For commercial applications, it may be advantageous to use the easily obtained crude 2,3,6-trichlorobenzyl chloride or 2,3,6-trichlorobenzyl alcohol which is contaminated with 2,4,5- and 2,3,4-trichlorobenzyl chloride or alcohol. We have found that the isomeric products other than the 2,3,6-isomer act essentially as inert contaminants, although in some cases slight synergism or antagonism may be observed.

It is an object of our invention to make available a series of compositions and methods for using said compositions which allow effective pre-emergence control of weeds with much less danger to standing crops and with longer duration of effectiveness than hitherto usual. It is a further object of our invention to provide compositions of general utility as herbicides and plant growth regulators.

The objects of our invention are achieved by treating the area to be kept free of weeds with a composition containing as an active ingredient a 2,3,6-trichlorobenzyl acid-ester of any one of the above-named polybasic acids or salt thereof.

As examples of compounds which have been found suitable for the purposes of this invention may be mentioned 2,3,6-trichlorobenzyl oxalate mono-ester, malonate mono-ester, succinate mono-ester, adipate mono-ester, maleate mono-ester, fumarate mono-ester, glutarate mono-ester, phthalate mono-ester, as well as analogs thereof having chlorine substituted on the dibasic acid moiety, as for example the dichloromalonate mono-ester, the tetrachlorosuccinate mono-ester, the dichloromaleate mono-ester. Further may be mentioned the mono esters with certain polybasic inorganic acids, as for example the 2,3,6-trichlorobenzyl sulfate mono-ester, the phosphate mono-ester, and the phosphate di-ester.

These esters may be used in the pure form, but are advantageously formulated with adjuvants such as water or other solvents, with surface-active agents, or with solid carriers such as clay, talc, carbon, or the like, which may contain suspending and wetting agents. An advantage of the mono-2,3,6-trichlorobenzyl esters of polybasic acids, is that they may be dissolved in water in the form of their salts, this being of obvious practical advantage. Suitable salts are especially the water-soluble salts, such as the lithium, sodium, potassium, ammonium, and alkylammonium salts. By alkylammonium salts it is meant to include the mono-, di-, tri-, or tetraalkylammonium, the mono-, di-, or tri-alkanol ammonium, the piperidinium, the morpholinium, and the N-alkylmorpholinium salts, the preferred embodiments being those in which the alkyl and alkanol radicals have 8 carbon atoms or less, these being designated hereinafter as "lower alkyl" and "lower alkanol" radicals, respectively.

To further illustrate the nature of this invention, the following examples are given, but are not to be construed as limiting, except as defined in the appended claims.

2,3,6-trichlorobenzyl chloride and 2,3,6-trichlorobenzyl alcohol are known compounds which can be prepared by the method of Brimelow, Jones and Metcalfe, J. Chem. Soc., 1951, 1208.

EXAMPLE 1

*2,3,6-trichlorobenzyl hydrogen phthalate*

A solution of 10.5 grams of 2,3,6-trichlorobenzyl alcohol and eight grams of phthalic anhydride in fifty grams of dry pyridine was allowed to stand at twenty to thirty degrees centigrade for one week, then evaporated to dryness, the residue taken up in benzene and dilute hydrochloric acid, and the insoluble portion removed by filtration. The solids were heated with four liters of water on the steam bath and filtered while warm to obtain fifteen grams of white crystalline solid, melting point 183.5 to 184.5 degrees centigrade.

*Analysis.*—Calcd. for $C_{15}H_9Cl_3O_4$: Cl, 29.6; found: Cl, 29.1. By titration to pH 8.5 using aqueous sodium hydroxide, the water-soluble sodium salt is made.

EXAMPLE 2

*2,3,6-trichlorobenzyl hydrogen succinate*

A solution of 10.5 grams of succinic anhydride and twenty-one grams of 2,3,6-trichlorobenzyl alcohol in one hundred ml. of dry pyridine was allowed to stand at twenty to thirty degrees centigrade for one week, then stripped free of pyridine and the residue triturated with two hundred ml. of benzene and 1000 ml. of dilute hydrochloric acid. The resultant solid was removed by filtration, and recrystallized from hot benzene to obtain twenty-six grams of crystalline solid, melting point 120.6 to 121.6 degrees centigrade.

*Analysis.*—Calcd. for $C_{11}H_9Cl_3O_4$: Cl, 33.1; found: Cl, 33.9. By titration to pH 8.5 using aqueous potassium hydroxide, the water-soluble potassium salt is made. By titration to pH 8.5 using aqueous sodium hydroxide the water-soluble sodium salt is made.

EXAMPLE 3

*2,3,6-trichlorobenzyl hydrogen adipate*

To a stirred molten mixture made by fusing 1500 grams of adipic acid and 100 grams of sodium hydroxide at 160° was added dropwise 575 grams of technical trichlorobenzyl chloride (about 50% 2,3,6-isomer, remainder 2,4,5-, 2,3,4- and 2,4,6-isomers. The heating was then continued for 10 hours at 160°. The mixture was then poured into hot water sufficient to dissolve the excess adipic acid. The solution was decanted from the insoluble crude product and the latter was then dissolved in benzene. The benzene solution was extracted with aqueous sodium carbonate solution which removed the product as sodium trichlorobenzyl adipate. The alkaline aqueous solution of the latter was acidified with HCl to precipitate the product, amounting to 618 grams of waxy solid.

*Analysis.*—Calcd. for $C_{13}H_{13}O_4Cl_3$: Neutralization equivalent 339.5; found: neutralization equivalent 335. Titration of the product with aqueous KOH to pH 9 gave the water-soluble potassium salt.

Evaporation of the carbonate-extracted benzene solution from the above preparation yielded 114 grams of the bis(2,3,6-trichlorobenzyl)ester of adipic acid, which was found to be substantially inactive as a herbicide at rates of 8 pounds per acre.

EXAMPLE 4

*2,3,6-trichlorobenzyl hydrogen sulfate (sodium salt)*

To 5.8 grams of chlorosulfonic acid in fifty ml. dry pyridine were added 10.5 grams of 2,3,6-trichlorobenzyl alcohol, the mixture heated one hour at ninety-five to one hundred degrees centigrade, evaporated under vacuum, the residue dissolved in water and 5.3 grams of anhydrous sodium carbonate added. The mixture was evaporated to dryness, one hundred ml. of dioxane added, and the mixture filtered. To the clear filtrate was added four hundred ml. of ether and the resultant crystalline precipitate removed by filtration and dried, yield thirteen grams of colorless crystalline solid with no sharp melting point.

*Analysis.*—Calcd. for $C_7H_4Cl_3SO_4Na$: Cl, 33.9; found: Cl, 32.8.

EXAMPLE 5

*Mixed chlorinated aliphatic dicarboxylic acid esters*

Following the procedure of Example 2, U.S. Patent 3,007,790, hexachlorobutadiene was treated with oxygen to produce a mixture of acid chlorides. The fractions distilling in the indicated ranges for dichloromalonyl dichloride, dichloromaleyl dichloride, and tetrachlorosuccinoyl dichloride were collected by fractional distillation. To this mixture of dibasic acid chlorides was added, with stirring and heating at 100° C., 2,3,6-trichlorobenzyl alcohol until one molar equivalent of hydrogen chloride had been evolved. The reaction mixture was then dissolved in xylene and agitated with water in the presence of 2% by weight of a non-ionic emulsifier comprising a polyoxyethylene sorbitan ester and an alkylarylsulfonate, thereby bringing about the hydrolysis of the remaining acid chloride function.

The resultant product in xylene solution comprised a mixture of the 2,3,6-trichlorobenzyl monoesters of dichloromalonic, dichloromaleic, and tetrachlorosuccinic acids, and was employed as such as a pre-emrgence herbicide.

The following examples illustrate some of the methods of formulation employed in our invention.

EXAMPLE 6

Five parts by weight of 2,3,6-trichlorobenzyl hydrogen phthalate were placed in twenty parts of water, and the equivalent quantity of triethylamine added to neutralize the acid group, forming a solution of triethylammonium salt in water.

EXAMPLE 7

| | Parts by weight |
|---|---|
| Sodium 2,3,6-trichlorobenzyl sulfate | 10 |
| Attapulgus clay | 90 |

The constituents are blended to make a dry mixture.

EXAMPLE 8

| | |
|---|---|
| Sodium 2,3,6-trichlorobenzyl succinate | 5 |
| Ethanol | 20 |
| Water | 25 |

EXAMPLE 9

| | |
|---|---|
| Potassium 2,3,6-trichlorobenzyl sulfate | 1 |
| Water | 99 |

This formulation is a clear solution.

EXAMPLE 10

| | |
|---|---|
| Dimethylammonium 2,3,6-trichlorobenzyl phthalate | 5 |
| Water | 25 |

This formulation is a clear solution.

EXAMPLE 11

| | |
|---|---|
| Ethanolammonium 2,3,6-trichlorobenzyl sulfate | 5 |
| Water | 25 |

This formulation is a clear solution.

EXAMPLE 12

| | |
|---|---|
| N-methylmorpholinium 2,3,6-trichlorobenzyl sulfate | 5 |
| Water | 25 |

This formulation is a clear solution.

EXAMPLE 13

Plots of sandy loam five feet by forty feet were plowed, disced, and then sprayed with the chemicals indicated in the table below. The plots were seeded with sweet corn, black beans, a mixture of broadleaf weeds (lambsquarters, ragweed, pigweed, smartweed), and grasses (millet, wildoats, foxtail). The plots were inspected seven weeks later with the results given in the table.

TABLE

| Chemical | Rate, lbs. Active Ingredient per Acre | Effect on Various Species | | | |
|---|---|---|---|---|---|
| | | Sweet Corn | Beans | Broadleaf Weeds | Grasses |
| 2,3,6-trichlorobenzyl hydrogen phthalate | 3 | 0-1 | 5 | 5 | 5 |
| Do | 1 | 0-1 | 5 | 5 | 4 |
| Do | 0.5 | 0 | 2 | 2 | 1-2 |
| 2,3,6-trichlorobenzyl sulfate (sodium) | 3 | *0 | 5 | 5 | 3-4 |
| Do | 1 | *0 | 5 | 5 | 1-3 |
| Do | 0.5 | *0 | 4-5 | 4-5 | 1-2 |

*Corn aided by weed control.
KEY: 0=no effect noted; 1=slight control; 2-4=increasing degrees of control; 5=complete control (no plants surviving).

EXAMPLE 14

An area in western New York State infested with a heavy population of perennial and annual weeds, principally wild carrot, toadflax, oxalis, chicory, daisy, plaintain, and goldenrod, was divided into plots which were sprayed in late spring with 2,3,6-trichlorobenzyl hydrogen adipate at 10 and 40 lbs./acre and 2,3,6-trichlorobenzyl trichloroacetate at 10 and 40 lbs./acre. Late in summer of the same year, the treated areas were inspected and weed control estimated relative to adjacent untreated area. The following was observed.

| Chemical | Rate, lbs./acre | Control Percent Kill |
|---|---|---|
| 2,3,6-trichlorobenzyl hydrogen adipate | 10 | 100 |
| 2,3,6-trichlorobenzyl hydrogen adipate | 40 | 100 |
| 2,3,6-trichlorobenzyl trichloroacetate | 10 | 10 |
| 2,3,6-trichlorobenzyl trichloroacetate | 40 | 30 |

EXAMPLE 15

An area infested with field bindweed (*Convolvulus arvensis*) was divided into plots and treated with compounds of the invention at various rates. Three months later, the percentage of kill of the bindweed was estimated with the following results:

| | Control at Indicated Rate | |
|---|---|---|
| | 6 lbs./acre | 12 lbs./acre |
| Sodium 2,3,6-trichlorobenzyl phthalate | 30 | 100 |
| Dimethylammonium trichlorobenzyl phthalate | 30 | 100 |
| Sodium 2,3,6-trichlorobenzyl sulfate | 20 | 90 |
| Disodium 2,3,6-trichlorobenzyl phosphate | 20 | 80 |
| 2,3,6-trichlorobenzyl hydrogen adipate | 50 | 100 |
| 2,3,6-trichlorobenzyl acetate | 0 | 20 |
| 2,3,6-trichlorobenzyl trichloroacetate | 0 | 20 |

EXAMPLE 16

An area infested with an established mixed population of ragweed, milkweed, mustard, plantain, yarrow, Canada thistle, dock, and quackgrass was divided into plots which were then sprayed with aqueous dispersions of several test chemicals at rates of 2.5, 5, 10, 20, 40 and 80 lbs./acre. Six months later, the area was inspected for completeness of weed control.

Chemical:  Approx rate required to give 90–100% control, lbs./acre
2,3,6-trichlorobenzyl hydrogen phthalate _____ 20
2,3,6-trichlorobenzyl acetate _____ above 80
2,3,6,-trichlorobenzyl naphthenate _____ above 80

The examples of the compositions of our invention and methods of preparing and utilizing them, which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:
1. A method for the control of weeds which comprises applying to the locus to be treated a phytotoxic amount of a composition comprising as an active ingredient a 2,3,6-trichlorobenzyl acid-ester of an acid selected from the group consisting of lower alkylene dicarboxylic acids, chlorine-substituted lower alkylene dicarboxylic acids, benzene dicarboxylic acid, sulfuric acid, and phosphoric acid, said acid ester having at least one unesterified acid function, and the alkali metal, ammonium, mono-, di-, tri-, and tetra-lower alkylammonium, mono-, di-, and tri-lower alkanolammonium, piperidinium, morpholinium, and alkylmorpholinium salts thereof.

2. A method according to claim 1 wherein the 2,3,6-trichlorobenzyl ester applied is 2,3,6-trichlorobenzyl hydrogen phthalate.

3. A method according to claim 1 wherein the 2,3,6-trichlorobenzyl ester applied is sodium 2,3,6-trichlorobenzyl phthalate.

4. A method according to claim 1 wherein the 2,3,6-trichlorobenzyl ester applied is 2,3,6-trichlorobenzyl hydrogen succinate.

5. A method according to claim 1 wherein the 2,3,6-trichlorobenzyl ester applied is sodium 2,3,6-trichlorobenzyl succinate.

6. A method according to claim 1 wherein the 2,3,6-trichlorobenzyl ester applied is potassium 2,3,6-trichlorobenzyl succinate.

7. A method according to claim 1 wherein the 2,3,6-trichlorobenzyl ester applied is 2,3,6-trichlorobenzyl hydrogen adipate.

8. A method according to claim 1 wherein the 2,3,6-trichlorobenzyl ester applied is sodium 2,3,6-trichlorobenzyl hydrogen adipate.

9. A method according to claim 1 wherein the 2,3,6-trichlorobenzyl ester applied is sodium 2,3,6-trichlorobenzyl sulfate.

10. A method according to claim 1 wherein the 2,3,6-trichlorobenzyl ester applied is mono-(2,3,6-trichlorobenzyl)-phosphate.

11. A method according to claim 1 wherein the 2,3,6-trichlorobenzyl ester applied is bis-(2,3,6-trichlorobenzyl)-phosphate.

(References on following page)

References Cited

UNITED STATES PATENTS

| | | | |
|---|---|---|---|
| 2,573,769 | 11/1951 | Lambrech et al. | 71—2.6 |
| 2,765,224 | 10/1956 | Lambrech et al. | 71—2.6 |
| 3,081,162 | 3/1963 | Tischler | 71—2.6 |
| 3,158,645 | 11/1964 | Newcomer et al. | 71—2.6 |

LEWIS GOTTS, *Primary Examiner.*

JAMES O. THOMAS, JR., *Examiner.*